US012771976B2

(12) United States Patent
Jin et al.

(10) Patent No.: US 12,771,976 B2
(45) Date of Patent: Oct. 20, 2026

(54) SPEAKER BOX

(71) Applicant: AAC Microtech (Changzhou) Co., Ltd., Changzhou City (CN)

(72) Inventors: Xin Jin, Changzhou (CN); Wei Song, Changzhou (CN); Yun Tang, Changzhou (CN); Xinyu Zhou, Changzhou (CN); Suntong Zhou, Changzhou (CN)

(73) Assignee: AAC Microtech (Changzhou) Co., Ltd., Changzhou City (CN)

( * ) Notice: Subject to any disclaimer, the term of this patent is extended or adjusted under 35 U.S.C. 154(b) by 100 days.

(21) Appl. No.: 19/048,824

(22) Filed: Feb. 7, 2025

(65) Prior Publication Data

US 2026/0149903 A1 May 28, 2026

Related U.S. Application Data

(63) Continuation of application No. PCT/CN2024/133868, filed on Nov. 22, 2024.

(51) Int. Cl.

| | |
|---|---|
| ***H04R 1/02*** | (2006.01) |
| ***H04R 1/28*** | (2006.01) |
| ***H04R 7/18*** | (2006.01) |
| ***H04R 9/02*** | (2006.01) |
| ***H04R 9/04*** | (2006.01) |
| ***H04R 9/06*** | (2006.01) |

(52) U.S. Cl.

CPC ........... *H04R 1/025* (2013.01); *H04R 1/2896* (2013.01); *H04R 7/18* (2013.01); *H04R 9/025* (2013.01); *H04R 9/045* (2013.01); *H04R 9/06* (2013.01); *H04R 2201/029* (2013.01); *H04R 2400/11* (2013.01); *H04R 2499/11* (2013.01)

(58) Field of Classification Search

CPC .... H04R 1/025; H04R 1/2811; H04R 1/2896; H04R 2201/029; H04R 2400/11; H04R 2499/11; H04R 2499/15; H04R 7/04; H04R 7/18; H04R 9/025; H04R 9/043; H04R 9/045; H04R 9/06

See application file for complete search history.

(56) References Cited

U.S. PATENT DOCUMENTS

| | | | | |
|---|---|---|---|---|
| 2021/0385562 | A1* | 12/2021 | Slotte | H04R 1/02 |
| 2023/0247348 | A1* | 8/2023 | Yang et al. | H04R 1/28 |
| 2023/0328449 | A1* | 10/2023 | Yang et al. | H04R 9/06 |

(Continued)

FOREIGN PATENT DOCUMENTS

| | | | |
|---|---|---|---|
| CN | 104185126 | * 12/2014 | H04R 9/06 |

*Primary Examiner* — Jason Chan

(74) *Attorney, Agent, or Firm* — Wiersch Law Group

(57) ABSTRACT

The present disclosure discloses a speaker box including a housing having an upper cover and a bottom cover enclosed a receiving space; a speaker unit received in the receiving space, including: a holder mounted on the upper cover; a vibration system mounted on the holder, including: a diaphragm and a coil; a magnet system, including: a first yoke; and a main magnet disposed on the first yoke; a support member fixed to one end of the holder facing the bottom cover and surrounding the magnet system at an interval; a flexible damping member sandwiched between the magnet system and the support member; and a first steel sheet arranged at a distance from the magnet system, including an outer edge fixed to one end of the support member away from the holder.

10 Claims, 7 Drawing Sheets

(56) References Cited

U.S. PATENT DOCUMENTS

| | | | | |
|---|---|---|---|---|
| 2024/0205576 | A1* | 6/2024 | Mao et al. ............... | H04R 1/02 |
| 2024/0276140 | A1* | 8/2024 | Li et al. ................... | H04R 1/28 |
| 2025/0330734 | A1* | 10/2025 | Jin et al. .................. | H04R 1/02 |
| 2026/0032376 | A1* | 1/2026 | Chen et al. .............. | H04R 1/28 |
| 2026/0032377 | A1* | 1/2026 | Chen et al. .............. | H04R 1/28 |

* cited by examiner

A-A

B-B

SPEAKER BOX

FIELD OF THE PRESENT DISCLOSURE

The present disclosure relates to electric-acoustic conversion technologies, especially relates to a speaker box applied in portable mobile terminals.

DESCRIPTION OF RELATED ART

A speaker box is a transducer converting the electrical signal into acoustic signal, generally being applied in portable mobile terminals such as earphone and mobile phone.

In related art, the speaker box includes a housing having a sound output channel, and a speaker unit received in the housing. The speaker unit includes a holder, a vibration system mounted on the holder, and a magnet system driving the vibration system to vibrate for generating acoustic signal. The acoustic signal is transmitted to outside through the sound output channel. However, the portable mobile terminals meeting miniaturization and ultrathin are required, thus limiting the application of the speaker box with large thickness.

Therefore, it is necessary to provide an improved speaker box to overcome the problems mentioned above.

SUMMARY OF THE INVENTION

One object of the present disclosure is to provide a thinner speaker box.

The speaker box includes a housing including: an upper cover; and a bottom cover enclosed a receiving space with the upper cover; a speaker unit received in the receiving space, including: a holder mounted on the upper cover; a vibration system mounted on the holder, including: a diaphragm mounted on the holder; and a coil configured to drive the diaphragm; a magnet system configured to drive the vibration system to vibrate along a vibration direction, including: a first yoke; and a main magnet disposed on the first yoke; a support member fixed to one end of the holder facing the bottom cover and surrounding the magnet system at an interval; a flexible damping member sandwiched between the magnet system and the support member; and a first steel sheet arranged at a distance from the magnet system, including an outer edge fixed to one end of the support member away from the holder; wherein the first steel sheet is located at one side of the magnet system away from the vibration system along the vibration direction.

As an improvement, the bottom cover includes a through hole penetrating thereon; one side of the first steel sheet away from the support member is mounted on the bottom cover and the through hole is wholly covered by the first steel sheet.

As an improvement, further including a second steel sheet in a rectangular ring shape; the first steel sheet is spaced from the bottom cover; the second steel sheet is configured to surround the support member at an interval; one end of the second steel sheet facing the bottom cover is connected to the outer edge of the first steel sheet.

As an improvement, the second steel sheet includes a main portion, a fixation portion bending from one end of the main portion closer to the bottom cover and extending to be fixed to the first steel sheet, and a flange bending from one end of the main portion closer to the upper cover and extending away from the support member.

As an improvement, the first steel sheet and the second steel sheet are integrated molded.

As an improvement, the second steel sheet includes a plurality of leakage holes penetrating on the main portion.

As an improvement, the magnet system further includes a side magnet arranged at a distance from the main magnet forming a magnetic gap, a second yoke disposed on the main magnet, a middle magnet disposed on the second yoke, and a third yoke disposed on the side magnet; the coil is inserted into the magnetic gap; one end of the flexible damping member away from the holder along the vibration direction is connected to the first yoke, the side magnet, and the third yoke.

As an improvement, the speaker unit further includes an elastic member, a support diaphragm mounted on one side of the elastic member away from the diaphragm, and a frame fixed to the diaphragm to suspend the coil; one end of the elastic member is connected to the holder, the other end of the elastic member is connected to the one end of the frame away from the diaphragm.

As an improvement, an amount of the flexible damping member is two; the two flexible damping members are separately arranged on two opposite sides of the support member.

As an improvement, the support member includes a loop portion in a rectangle shape, and two support portions extending from the loop portion to be fixed to the holder; the loop portion is spaced from the holder; the first steel sheet is fixed to the loop portion; the two flexible damping members are separately fixed to the two support portions.

BRIEF DESCRIPTION OF THE DRAWINGS

The present disclosure will hereinafter be described in detail with reference to an exemplary embodiment. To make the technical problems to be solved, technical solutions and beneficial effects of present disclosure more apparent, the present disclosure is described in further detail together with the figures and the embodiment. It should be understood the specific embodiment described hereby is only to explain this disclosure, not intended to limit this disclosure.

DETAILED DESCRIPTION OF THE EXEMPLARY EMBODIMENTS

The present disclosure will hereinafter be described in detail with reference to exemplary embodiments. To make the technical problems to be solved, technical solutions and beneficial effects of the present disclosure more apparent, the present disclosure is described in further detail together with the figure and the embodiment. It should be understood the specific embodiments described hereby is only to explain the disclosure, not intended to limit the disclosure.

Figure 1:
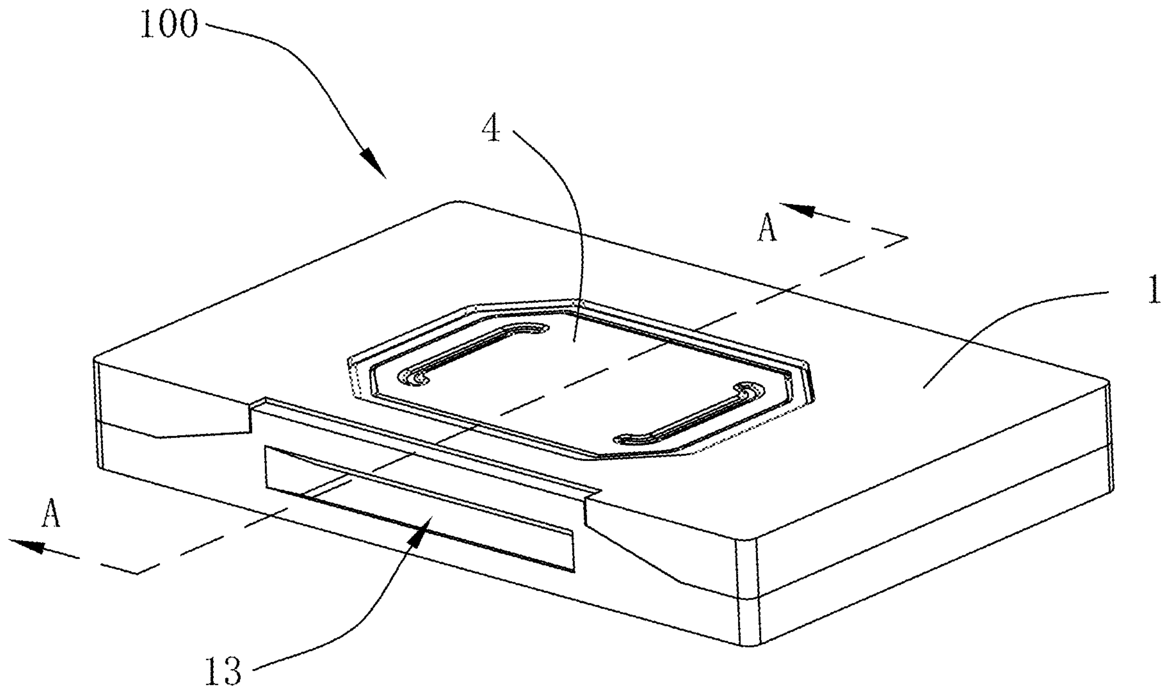
FIG. 1 is an isometric view of a speaker box in accordance with an exemplary embodiment of the present disclosure.
Figure 2:
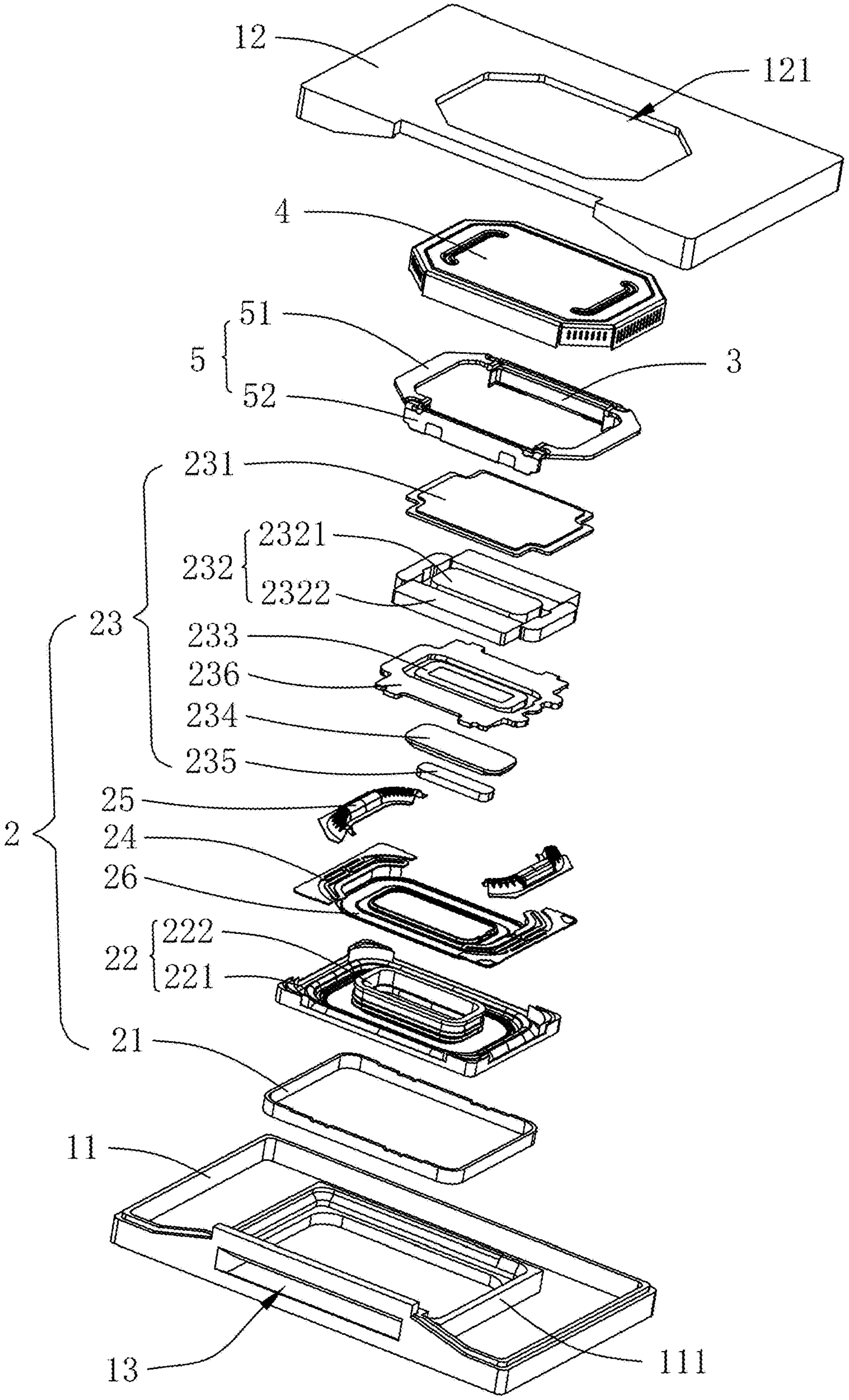
FIG. 2 is an exploded view of the speaker box in FIG. 1.
Figure 3:
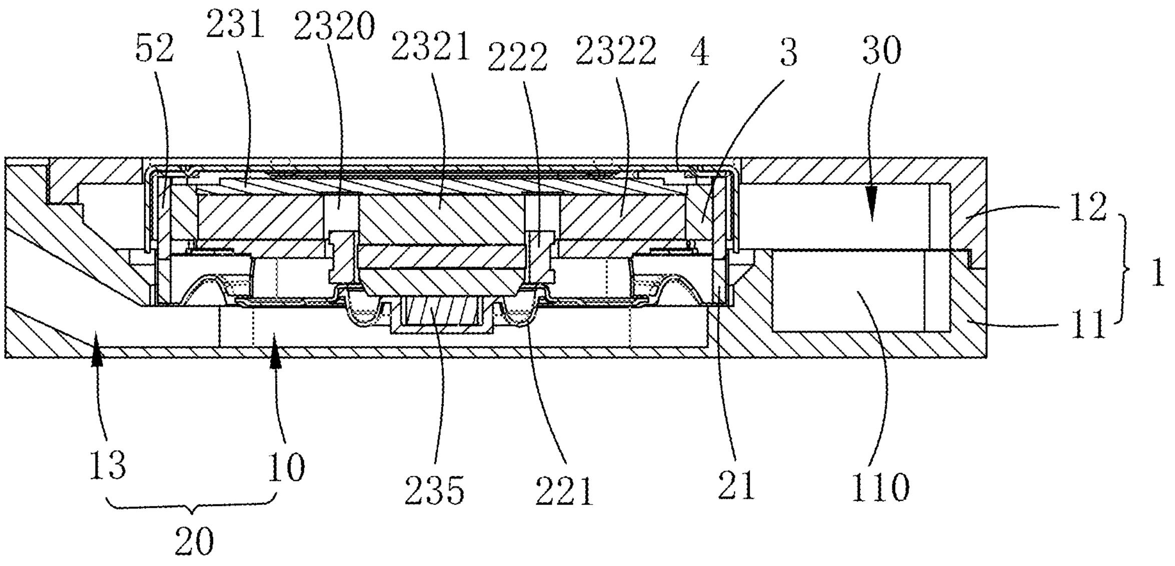
FIG. 3 is a cross-sectional view of the speaker box taken along line A-A in FIG. 1.

Please refer to FIGS. 1-3 together, a speaker box 100 provided by an exemplary embodiment of the present disclosure includes a housing 1, a speaker unit 2, a flexible damping member 3, a first steel sheet 4, and a support member 5.

To be specific, the housing 1 includes an upper cover 11 having a sound output channel 13 penetrating thereon, and a bottom cover 12 mounted on the upper cover 11 and enclosed a receiving space 110 with the upper cover 11. The upper cover 11 includes a support wall 111 extending towards the bottom cover 12. The speaker unit 2 is received in the receiving space 110 and mounted on the support wall 111 dividing the receiving space 110 into a front sound cavity 10 and a back cavity 30. The front sound cavity 10 enclosed by the speaker unit 2 and the upper cover 11 is connected with the sound output channel 13 to enclose a front cavity 20. The back cavity 30 is enclosed by the speaker unit 2 and the bottom cover 12.

Specifically, the speaker unit 2 includes a holder 21 mounted on the support wall 111 of the upper cover 11, a vibration system 22 mounted on the holder 21, and a magnet system 23 configured to drive the vibration system 22 to vibrate along a vibration direction. The magnet system 23 is located at one side of the vibration system 22 away from the upper cover 11.

The vibration system 22 includes a diaphragm 221 mounted on the holder 21, and a coil 222 configured to drive the diaphragm 221.

The magnet system 23 includes a first yoke 231, and a magnet 232 disposed on the first yoke 231. The magnet 232 includes a main magnet 2321 and a side magnet 2322 arranged at a distance from the main magnet 2321 forming a magnetic gap 2320, a second yoke 233 disposed on the main magnet 2321, a middle magnet 234 disposed on the second yoke 233, a top magnet 235 disposed on the middle magnet 234, and a third yoke 236 disposed on one side of the side magnet 2322 away from the first yoke 231. The coil 222 is inserted into the magnetic gap 2320. An amount of the side magnet 2322 is four. The four side magnets 2322 are arranged around the main magnet 2321.

The speaker unit 2 includes an elastic member 24, a support diaphragm 25 mounted on one side of the elastic member 24 away from the diaphragm 221, and a frame 26 fixed to the diaphragm 221 to suspend the coil 222. One end of the elastic member 24 is connected to the holder 21, the other end of the elastic member 24 is connected to the one end of the frame 26 away from the diaphragm 221. In one embodiment, an amount of the elastic member 24 is two. The two elastic members 24 are located on two opposite sides of the magnet system 23. Accordingly, an amount of the support diaphragm 25 is two, thus ensuring the vibration stability of the coil 222 and the diaphragm 221.

The support member 5 is fixed to one end of the holder 21 facing the bottom cover 12 and surrounding the magnet system 23 at an interval.

In addition, the flexible damping member 3 is sandwiched between the magnet system 23 and the support member 5 to elastically suspend the magnet system 23. Thus, when the vibration system 22 vibrates accompanying with a reactive force being applied on the magnet system 23, the vibration of the magnet system 23 could be absorbed by the flexible damping member 3, thus preventing the vibration of the holder 21 and improving the vibration stability of the vibration system 22.

In one embodiment, an amount of the flexible damping member 3 is two. The two flexible damping members 3 are separately arranged on two opposite sides of the support member 5. One end of the flexible damping member 3 away from the support member 5 is fixedly connected to the magnet system 23. Specifically, the end of the flexible damping member 3 away from the holder 21 along the vibration direction is connected to the first yoke 231, the side magnet 2322, and the third yoke 235. Moreover, the flexible damping member 3 is made of insulation material such as rubber.

Furthermore, the first steel sheet 4 is located at one side of the magnet system 23 away from the vibration system 22 along the vibration direction. The first steel sheet 4 includes an outer edge 40 fixed to one end of the support member 5 away from the holder 21. The bottom cover 12 includes a through hole 121 penetrating thereon. One side of the first steel sheet 4 away from the support member 5 is mounted on the bottom cover 12 and the through hole 121 is wholly covered by the first steel sheet 4. In this manner, the first steel sheet 4 could be served as a part of the housing 1, thus reducing the thickness of the speaker box 100.

Besides, the support member 5 includes a loop portion 51 in a rectangle shape, and two support portions 52 extending from the loop portion 51 to be fixed to the holder 21. The loop portion 51 is spaced from the holder 21. The first steel sheet 4 is fixed to the loop portion 51. The two flexible damping members 3 are separately fixed to the two support portions 52.

Figure 4:
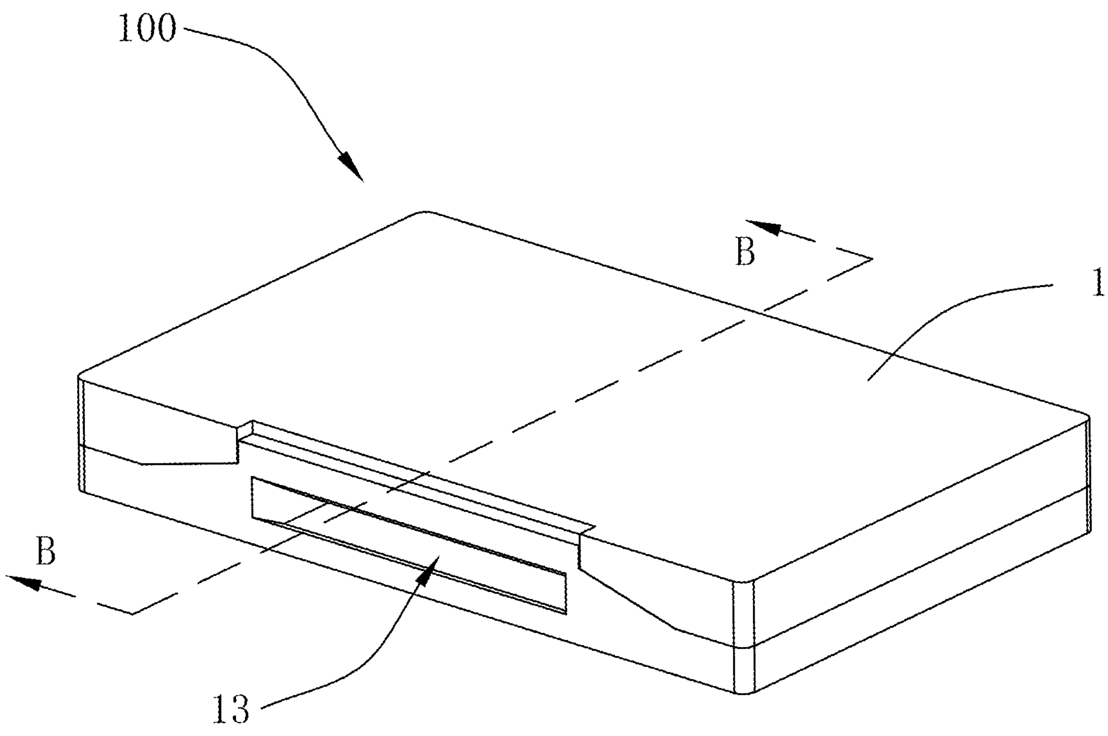
FIG. 4 is an isometric view of a speaker box in accordance with another exemplary embodiment of the present disclosure.
Figure 5:
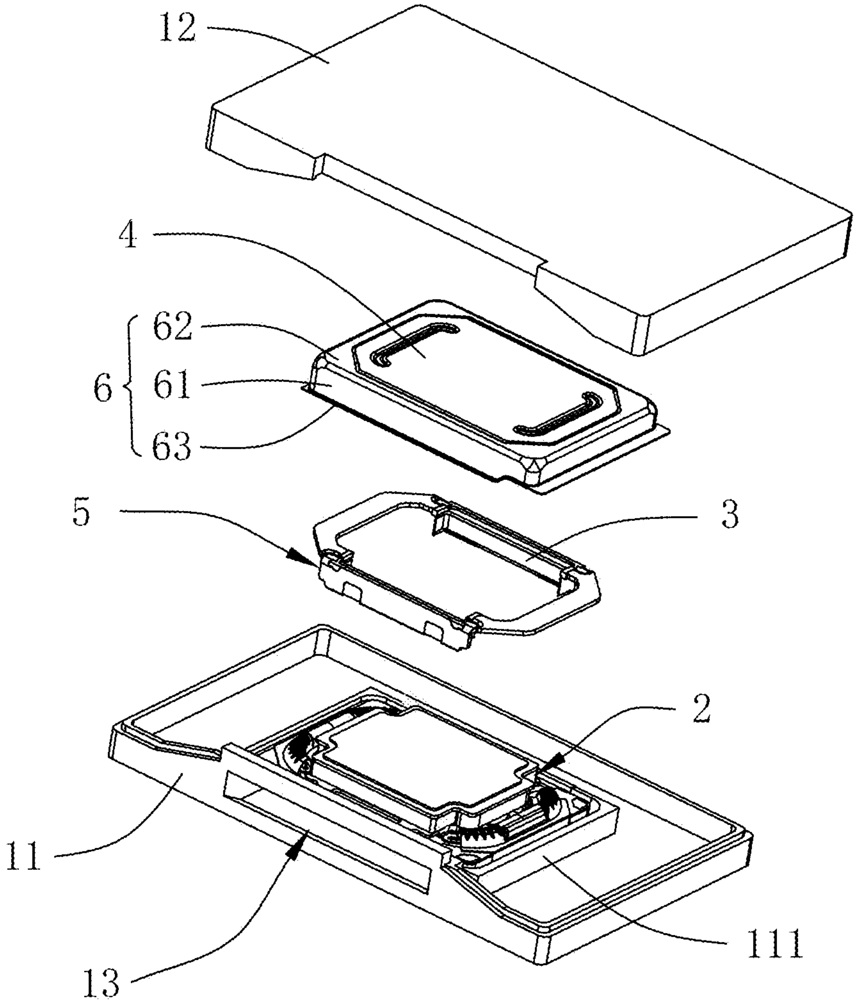
FIG. 5 is an exploded view the speaker box in FIG. 4.
Figure 6:
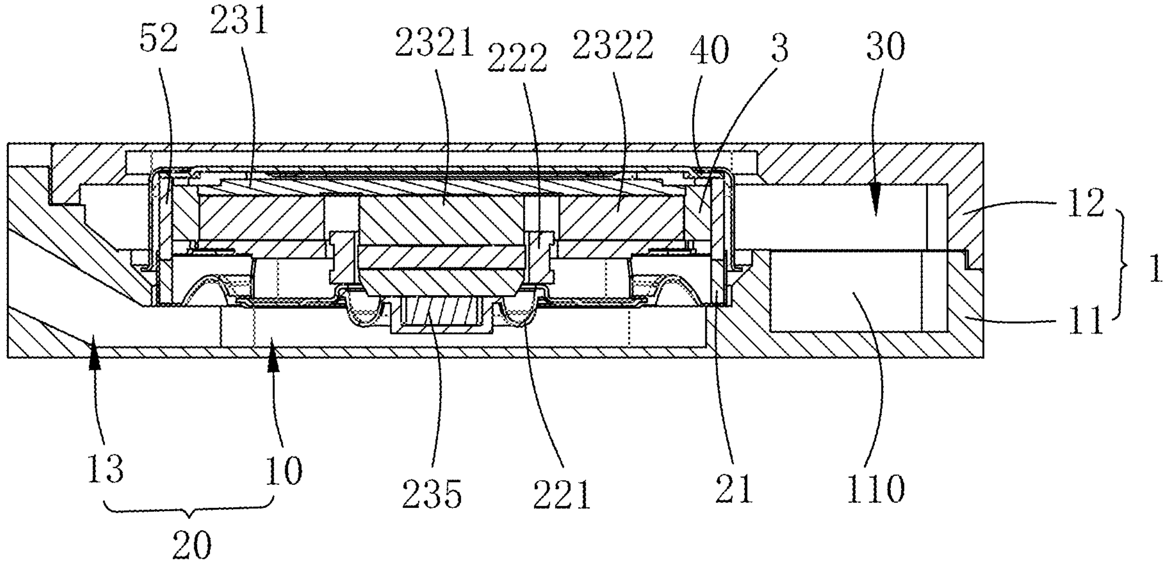
FIG. 6 is a cross-sectional view of the speaker box taken along line B-B in FIG. 4

As shown in FIGS. 4-6, there is no through hole 121 on the bottom cover 12. The first steel sheet 4 is spaced from the bottom cover 12. The speaker box further includes a second steel sheet 6 in a rectangular ring shape. The second steel sheet 6 is configured to surround the support member 5 at an interval. One end of the second steel sheet 6 facing the bottom cover 12 is connected to the outer edge 40 of the first steel sheet 4. Therefore, the magnet system 23 is jointly surrounded by the first steel sheet 4 and the second steel sheet 6, thus avoiding the interference between the magnet system 23 and other components when the magnet system 23 sways. Moreover, if the back cavity 30 is filled with sound absorbing materials, the magnet system 23 is isolated with the sound absorbing material via the first steel sheet 4 and the second steel sheet 6, thus ensuring the stable acoustic performance of the speaker box 100.

Furthermore, the second steel sheet 6 includes a main portion 61, a fixation portion 62 bending from one end of the main portion 61 closer to the bottom cover 12 and extending to be fixed to the first steel sheet 4, and a flange 63 bending from one end of the main portion 61 closer to the upper cover 11 and extending away from the support member 5. Besides, the second steel sheet 6 includes a plurality of leakage holes 611 penetrating on the main portion 61 to balance the air pressure inside the speaker unit 2.

Figure 7:
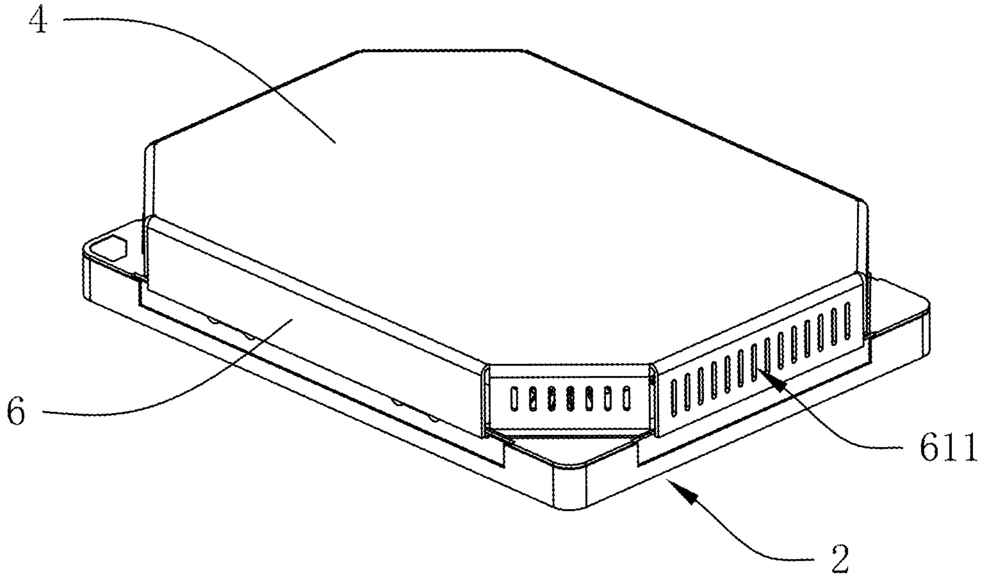
FIG. 7 is an isometric view of a speaker box without a housing in accordance with another exemplary embodiment of the present disclosure.

As shown in FIG. 7, the first steel sheet 4 and the second steel sheet 6 are integrated molded, thus decreasing their assembly space and maximizing the filling amount of the sound absorbing material.

It is to be understood, however, that even though numerous characteristics and advantages of the present exemplary embodiments have been set forth in the foregoing description, together with details of the structures and functions of the embodiments, the disclosure is illustrative only, and changes may be made in detail, especially in matters of shape, size, and arrangement of parts within the principles of the invention to the full extent indicated by the broad general meaning of the terms where the appended claims are expressed.

What is claimed is:

1. A speaker box comprising:

a housing comprising:

an upper cover; and a bottom cover enclosed a receiving space with the upper cover;

a speaker unit received in the receiving space, comprising:

a holder mounted on the upper cover;

a vibration system mounted on the holder, comprising:

a diaphragm mounted on the holder; and a coil configured to drive the diaphragm;

a magnet system configured to drive the vibration system to vibrate along a vibration direction, comprising:

a first yoke; and a main magnet disposed on the first yoke;

a support member fixed to one end of the holder facing the bottom cover and surrounding the magnet system at an interval;

a flexible damping member sandwiched between the magnet system and the support member; and a first steel sheet arranged at a distance from the magnet system, including an outer edge fixed to one end of the support member away from the holder; wherein the first steel sheet is located at one side of the magnet system away from the vibration system along the vibration direction.

2. The speaker box as described in claim 1, wherein the bottom cover comprises a through hole penetrating thereon; one side of the first steel sheet away from the support member is mounted on the bottom cover and the through hole is wholly covered by the first steel sheet.

3. The speaker box as described in claim 1, further comprising a second steel sheet in a rectangular ring shape; the first steel sheet is spaced from the bottom cover; the second steel sheet is configured to surround the support member at an interval; one end of the second steel sheet facing the bottom cover is connected to the outer edge of the first steel sheet.

4. The speaker box as described in claim 3, wherein the second steel sheet comprises a main portion, a fixation portion bending from one end of the main portion closer to the bottom cover and extending to be fixed to the first steel sheet, and a flange bending from one end of the main portion closer to the upper cover and extending away from the support member.

5. The speaker box as described in claim 4, wherein the first steel sheet and the second steel sheet are integrated molded.

6. The speaker box as described in claim 4, wherein the second steel sheet comprises a plurality of leakage holes penetrating on the main portion.

7. The speaker box as described in claim 1, wherein the magnet system further comprises a side magnet arranged at a distance from the main magnet forming a magnetic gap, a second yoke disposed on the main magnet, a middle magnet disposed on the second yoke, and a third yoke disposed on the side magnet; the coil is inserted into the magnetic gap; one end of the flexible damping member away from the holder along the vibration direction is connected to the first yoke, the side magnet, and the third yoke.

8. The speaker box as described in claim 7, wherein the speaker unit further comprises an elastic member, a support diaphragm mounted on one side of the elastic member away from the diaphragm, and a frame fixed to the diaphragm to suspend the coil; one end of the elastic member is connected to the holder, the other end of the elastic member is connected to the one end of the frame away from the diaphragm.

9. The speaker box as described in claim 1, wherein an amount of the flexible damping member is two; the two flexible damping members are separately arranged on two opposite sides of the support member.

10. The speaker box as described in claim 1, wherein the support member comprises a loop portion in a rectangle shape, and two support portions extending from the loop portion to be fixed to the holder; the loop portion is spaced from the holder; the first steel sheet is fixed to the loop portion; the two flexible damping members are separately fixed to the two support portions.

* * * * *